US012771640B2

(12) United States Patent
Mangla et al.

(10) Patent No.: US 12,771,640 B2
(45) Date of Patent: Oct. 20, 2026

(54) UPDATING AN INGRESS FILTER OF AN INGRESS NODE THAT PROVIDES A LOAD BALANCING FUNCTIONALITY ACROSS SECURITY NODES

(71) Applicant: Juniper Networks, Inc., Sunnyvale, CA (US)

(72) Inventors: Umesh Mangla, Sunnyvale, CA (US); Avinash Kumar Singh, Fremont, CA (US); Dilip H. Sanghavi, San Ramon, CA (US); Sai Sundar Ramamurthy, Sunnyvale, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 9 days.

(21) Appl. No.: 18/502,571

(22) Filed: Nov. 6, 2023

(65) Prior Publication Data

US 2025/0150395 A1 May 8, 2025

(51) Int. Cl.
*H04L 47/125* (2022.01)
*H04L 9/40* (2022.01)

(52) U.S. Cl.
CPC ........ *H04L 47/125* (2013.01); *H04L 63/0236* (2013.01); *H04L 63/16* (2013.01)

(58) Field of Classification Search
CPC ............. H04L 67/1001; H04L 67/1004; H04L 47/125; H04L 63/0236; H04L 63/16; H04L 63/0209; H04L 63/0263
See application file for complete search history.

(56) References Cited

U.S. PATENT DOCUMENTS

| | | | | |
|---|---|---|---|---|
| 10,153,978 | B1 * | 12/2018 | di Proietto | H04L 45/306 |
| 2006/0117058 | A1 * | 6/2006 | Smith | H04L 63/105 707/999.102 |
| 2010/0251355 | A1 * | 9/2010 | Li | H04L 63/02 726/13 |
| 2017/0118173 | A1 * | 4/2017 | Arramreddy | H04L 63/20 |
| 2018/0183831 | A1 | 6/2018 | Amin | |

(Continued)

OTHER PUBLICATIONS

Y. Abiko, T. Saito, D. Ikeda, K. Ohta, T. Mizuno and H. Mineno, “Flexible Resource Block Allocation to Multiple Slices for Radio Access Network Slicing Using Deep Reinforcement Learning,” in IEEE Access, vol. 8, pp. 68183-68198, 2020, (Year: 2020).*

(Continued)

*Primary Examiner* — Messeret F Gebre
(74) *Attorney, Agent, or Firm* — Harrity & Harrity, LLP

(57) ABSTRACT

In some implementations, an ingress node may receive first traffic from a host device. The ingress node may determine and based on an ingress filter of the ingress node, that traffic from the host device is allowed. The ingress node may select, using a load balancing functionality, and based on determining that traffic from the host device is allowed, a security node, of a plurality of security nodes, to which the ingress node is to forward the first traffic. The ingress node may forward the first traffic to the selected security node. The ingress node may receive, based on forwarding the first traffic, a message that indicates that traffic from the host device is to be blocked. The ingress node may update, using the message, the ingress filter of the ingress node to indicate that traffic from the host device is to be blocked.

20 Claims, 9 Drawing Sheets

(56) References Cited

U.S. PATENT DOCUMENTS

| | | | | |
|---|---|---|---|---|
| 2019/0222612 | A1* | 7/2019 | Nainar | H04L 12/4633 |
| 2022/0279564 | A1* | 9/2022 | Li | H04W 72/23 |

OTHER PUBLICATIONS

J. Hsue, "DOCSIS based ingress noise blocker (DNB)," 2010 IEEE International Symposium on Broadband Multimedia Systems and Broadcasting (BMSB), Shanghai, China, 2010, pp. 1-25 (Year: 2010).*

Extended European Search Report for European Application No. EP241500131 dated Jun. 28, 2024, 8 pages.

* cited by examiner

UPDATING AN INGRESS FILTER OF AN INGRESS NODE THAT PROVIDES A LOAD BALANCING FUNCTIONALITY ACROSS SECURITY NODES

BACKGROUND

An ingress node can provide an entry point to a network (e.g., a cloud network). The ingress node can receive incoming traffic and forward the traffic to another node within the network (e.g., to allow a service or functionality to be performed on the traffic).

SUMMARY

In some implementations, a method includes receiving, by an ingress node, first traffic from a host device; determining, by the ingress node, and based on an ingress filter of the ingress node, that traffic from the host device is allowed; selecting, by the ingress node, using a load balancing functionality, and based on determining that traffic from the host device is allowed, a security node, of a plurality of security nodes, to which the ingress node is to forward the first traffic; forwarding, by the ingress node, the first traffic to the selected security node; receiving, by the ingress node and based on forwarding the first traffic, a message that indicates that traffic from the host device is to be blocked; and updating, by the ingress node and using the message, the ingress filter of the ingress node to indicate that traffic from the host device is to be blocked.

In some implementations, a security node includes one or more memories, and one or more processors to: receive first traffic that was forwarded by an ingress node and that originated from a host device; determine, by providing a security functionality, that the first traffic is to be blocked; block, based on determining that the first traffic is to be blocked, the first traffic; and send, to the ingress node, and based on determining that the first traffic is to be blocked, a message that indicates that traffic from the host device is to be blocked.

In some implementations, a non-transitory computer-readable medium storing a set of instructions includes one or more instructions that, when executed by one or more processors of an ingress node, cause the ingress node to: receive first traffic from a host device; select, based on an ingress filter of the ingress node, a security node, of a plurality of security nodes, to which the ingress node is to forward the first traffic; forward the first traffic to the selected security node; receive, based on forwarding the first traffic, a message that indicates that traffic from the host device is to be blocked; and update, by the ingress node and using the message, the ingress filter of the ingress node.

DETAILED DESCRIPTION

Figure 1A:
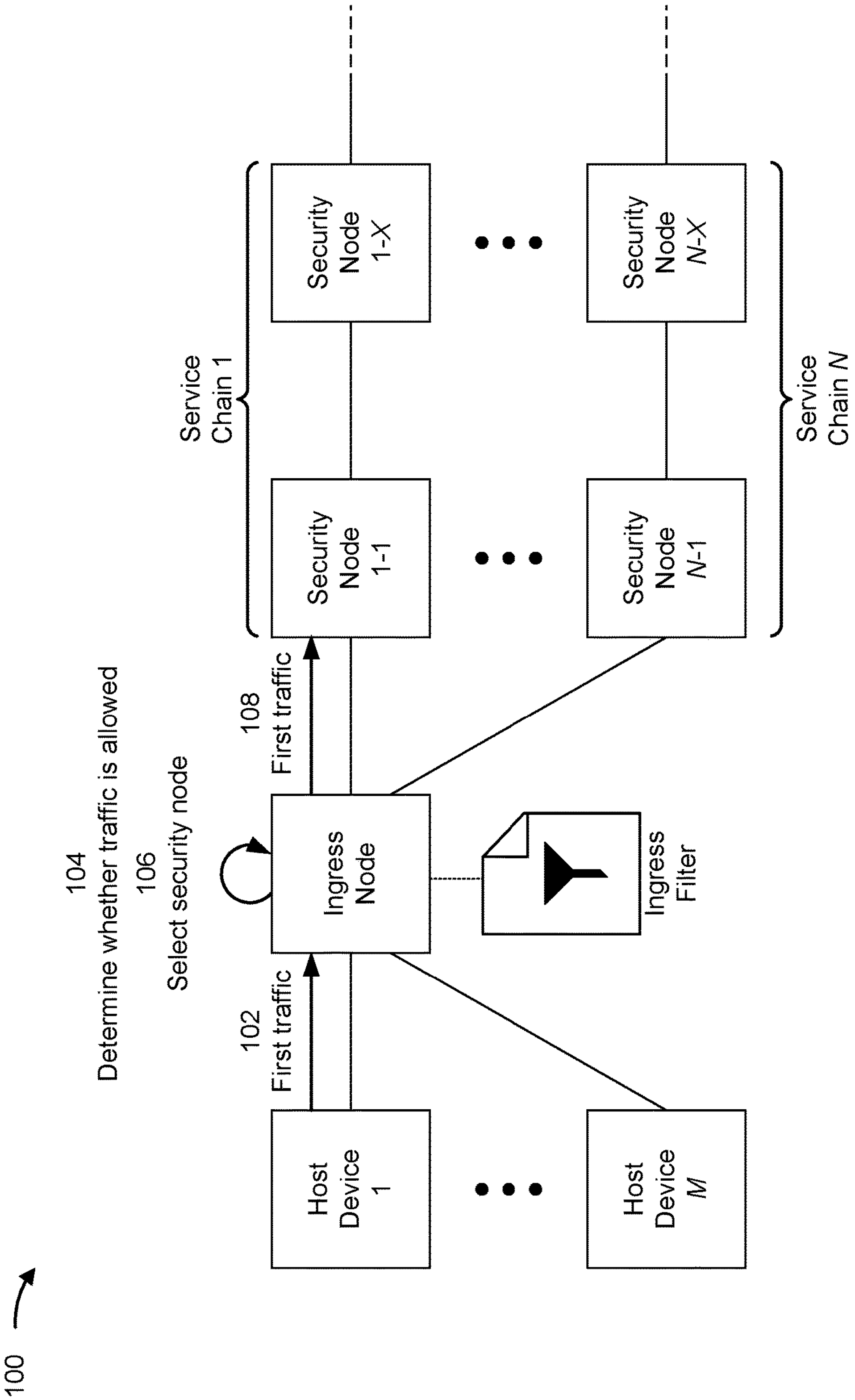
FIGS. 1A-1C are diagrams of an example implementation associated with updating an ingress filter of an ingress node that provides a load balancing functionality across security nodes.

The following detailed description of example implementations refers to the accompanying drawings. The same reference numbers in different drawings may identify the same or similar elements.

An ingress node associated with a network can receive traffic from a host device and can select a security node, of a plurality of security nodes that are associated with the network, that is to provide one or more security functionalities (e.g., firewall functionalities, packet inspection functionalities, content inspection functionalities, intrusion prevention functionalities, and/or other security functionalities) in association with the traffic. The ingress node can then forward the traffic to the security node (e.g., the selected security node). In some cases, the security node determines (e.g., by performing a security functionality in association with the traffic) that the traffic and/or the host device (e.g., as the originator of the traffic) is malicious, compromised, or otherwise untrustworthy. Accordingly, the security node can drop the traffic and update a filter on the security node to indicate that the security node is to drop traffic (e.g., additional traffic) from the host device. This prevents the additional traffic from being forwarded by the security device, which can improve an overall security of the network. However, the ingress node still consumes computing resources (e.g., processing resources, memory resources, communication resources, and/or power resources, among other examples) to process the additional traffic, to determine where to forward the additional traffic, and to forward the additional traffic. Further, the ingress node may forward the additional traffic to another security node (e.g., that did not analyze the original traffic that originated from the host device). The other security node then consumes computing resources to process the additional traffic, such as to determine that the additional traffic and/or that the host device is malicious, compromised, or otherwise untrustworthy; to drop the additional traffic; and to update a filter on the other security node to drop traffic from the host device. Even worse, in some cases, the other security node can fail to identify any issues with the additional traffic and thereby forward the additional traffic, which risks the overall security of the network.

Some implementations described herein include an ingress node and a plurality of security nodes. The ingress node provides a load balancing functionality across the plurality of security nodes. For example, the ingress node receives first traffic from a host device and selects a security node, of the plurality of security nodes, to which the ingress node is to forward the first traffic. The ingress node thereby forwards the first traffic to the selected security node.

The selected security node (or another security node associated with a service chain, when the selected security node is part of the service chain) may determine (e.g., by providing at least one security functionality) that the first traffic is to be blocked. The selected security node then blocks the first traffic (e.g., prevents the first traffic from being forwarded) and sends, to the ingress node, a message indicating that traffic (e.g., additional traffic) from the host device is to be blocked. The ingress node thereby updates an ingress filter of the ingress node to indicate that traffic from the host device is to be blocked.

Accordingly, the ingress node then receives second traffic from the host device. The ingress node, based on the ingress filter (e.g., after the ingress filter was updated based on the message), determines that traffic from the host device is not allowed. The ingress node thereby blocks the second traffic.

In this way, a security node (e.g., the selected security node) blocks first traffic from a host device that is malicious, compromised, or otherwise untrustworthy, from being forwarded, which improves an overall security of a network (e.g., that includes the plurality of security nodes). Further, by providing a message that allows the ingress node to update an ingress filter of the ingress node, the ingress node is able to block second traffic from the host device. Computing resources (e.g., processing resources, memory resources, communication resources, and/or power resources, among other examples) of the ingress node therefore do not need to be used to process the second traffic, and the second traffic is prevented from being forwarded to another node within the network. This improves an overall security of the network. Further, because the ingress node maintains an ingress filter for allowing or blocking traffic from host devices, individual security nodes do not need to consume computing resources to maintain respective filters for allowing or blocking traffic.

Figure 1B:
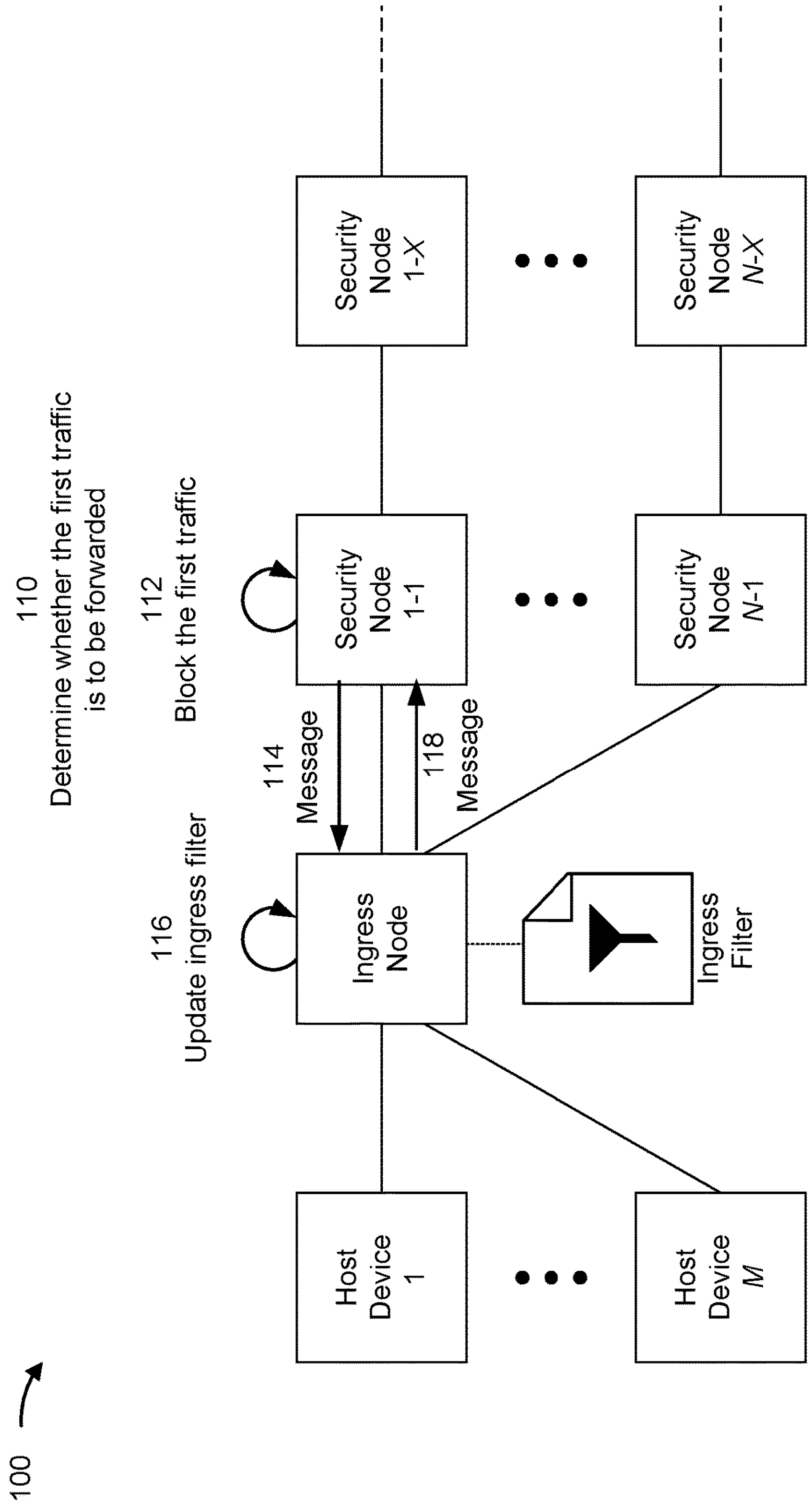
Figure 1C:
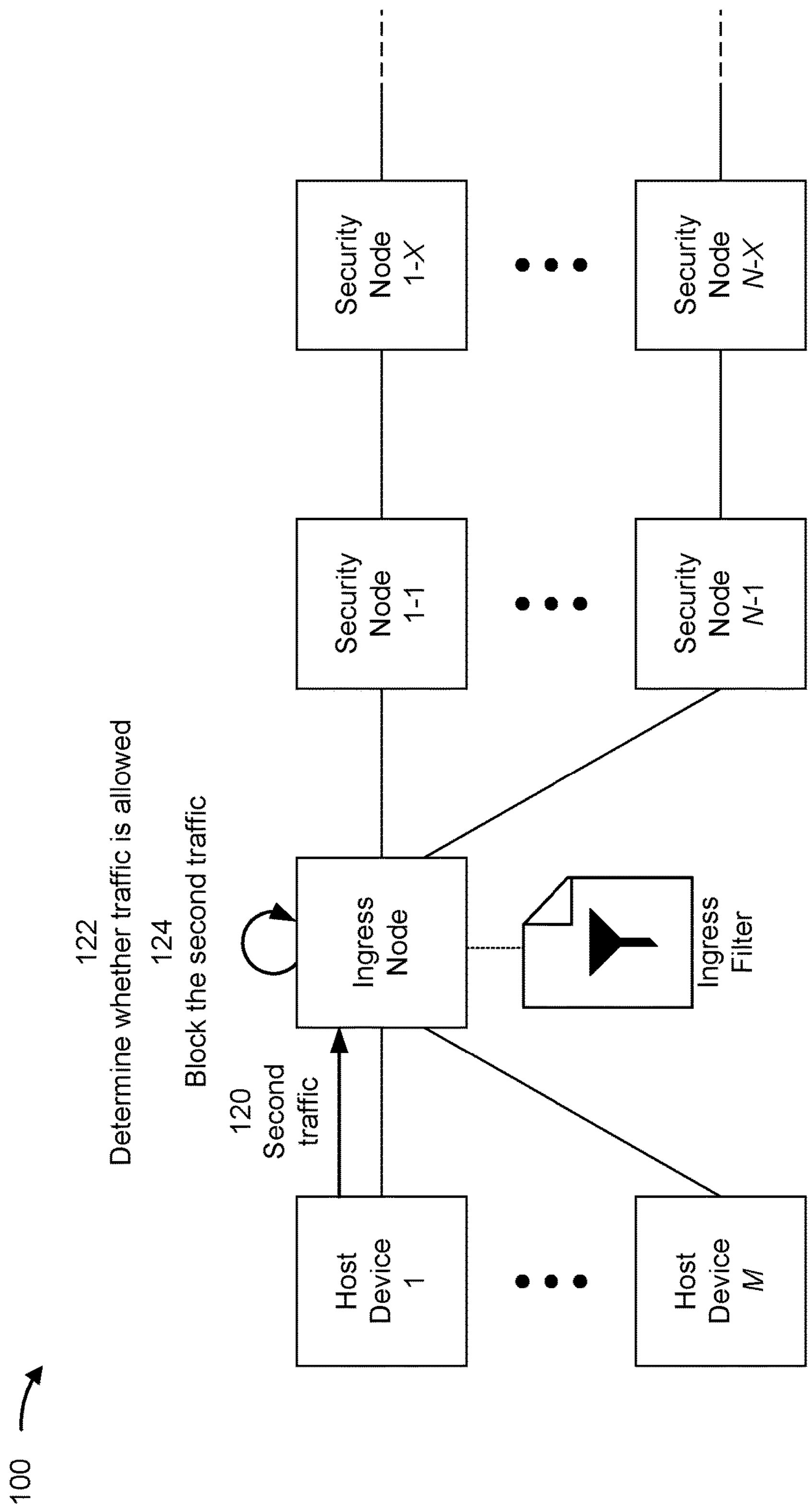

FIGS. 1A-1C are diagrams of an example implementation 100 associated with updating an ingress filter of an ingress node that provides a load balancing functionality across security nodes. As shown in FIGS. 1A-1C, example implementation 100 includes a plurality of host devices (shown as host devices 1 through M, where M≥2), an ingress node, and a plurality of security nodes (shown as security nodes 1-1 through N-X, where N≥2 and X≥1). These devices are described in more detail below in connection with FIGS. 3-5.

The ingress node and the plurality of security nodes may be associated with a network (e.g., that is associated with a cloud environment). For example, the ingress node and the plurality of security nodes may provide a plurality of security functionalities (e.g., firewall functionalities, packet inspection functionalities, content inspection functionalities, intrusion prevention functionalities, and/or other security functionalities) for traffic that originates from a host device of the plurality of host devices (and that is destined for another network, such as the Internet). Each security functionality may be associated with at least one layer of layers 3 through 7 of an open systems interconnection (OSI) model.

In some implementations, the ingress node may be configured to provide at least one security functionality that is associated with layer 3 of the OSI model (e.g., a filtering functionality, a firewall functionality, or another type of functionality). For example, the ingress node may include an ingress filter (e.g., that may include an access control list (ACL), or another type of filter) that the ingress node may use to determine whether to allow or to block traffic. The ingress filter may indicate, for example, whether traffic associated with a particular source internet protocol (IP) address, a particular destination IP address, a particular source port, and/or a particular destination port is allowed (e.g., is allowed to be forwarded by the ingress node) or is not allowed (e.g., is not allowed to be forwarded by the ingress node, and/or is to be blocked by the ingress node).

Each security node, of the plurality of security nodes, may be configured to provide at least one security functionality associated with at least one layer of layers 4 through 7 of the OSI model (e.g., a packet inspection functionality, a content inspection functionality, an intrusion prevention functionality, and/or another type of security functionality). The ingress node may be configured to provide a load balancing functionality across the plurality of security nodes. For example, the ingress node may be configured to select a security node to which the ingress node is to forward traffic (e.g., from a host device of the plurality of host devices). In this way, the ingress node may distribute incoming traffic (e.g., from the plurality of host devices) across the plurality of security nodes to prevent overloading of individual security nodes.

As shown in FIG. 1A, the plurality of security nodes may be grouped into a plurality service chains (e.g., shown as service chains 1 through N). Each service chain may include a set of one or more security nodes, of the plurality of security nodes, where each security node of the service chain provides at least one particular security functionality (e.g., that is associated with at least one layer of layer 4 through 7 of the OSI model). For example, with respect to FIG. 1A, the security node 1-1 of the service chain 1 may provide a packet inspection functionality (e.g., a secure sockets layer (SSL) or transport layer security (TLS) inspection functionality), the security node 1-X of the service chain 1 may provide an intrusion prevention functionality (e.g., a suspicious traffic signature-matching functionality), and so on. Accordingly, traffic that is forwarded to a service chain (e.g., by the ingress node) may be sequentially processed and forwarded by each security node in the service chain. Each service chain may be similarly configured. For example, the security nodes 1-1 through 1-X of the service chain 1 may respectively provide the same, or similar, security functionalities (in the same, or similar, order) as the security nodes N-1 through N-X of the service chain N.

Accordingly, the ingress node may be configured to provide a load balancing functionality across the plurality of service chains. For example, the ingress node may be configured to select a security node (e.g., that is a first security node of a service chain) to which the ingress node is to forward traffic (e.g., from a host device of the plurality of host devices). In this way, the ingress node may distribute incoming traffic (e.g., from the plurality of host devices) across the plurality of service chains to prevent overloading of individual service chains.

As shown in FIG. 1A, and by reference number 102, the host device 1, of the plurality of host devices, may send first traffic to the ingress node. The host device 1 may send the first traffic to the ingress node via a connection between the host device 1 and the ingress node. Accordingly, the ingress node may receive the first traffic from the host device 1 (e.g., via the connection between the host device 1 and the ingress node).

The host device 1 may send the first traffic to the ingress node to allow the ingress node and one or more security nodes to provide at least one security functionality associated with the first traffic and/or to allow the first traffic to be forwarded (e.g., to a destination indicated by the first traffic). While FIG. 1A shows the host device 1 sending the first traffic to the ingress node, any host device of the plurality of host devices that is connected to the ingress node (e.g., via a connection between the host device and the ingress node) may send traffic to the ingress node. Accordingly, any operation described herein that is performed by the ingress node or a security node in association with traffic (e.g., first traffic or second traffic) that originates from the host device 1 may be similarly performed by the ingress node or the security node in association with traffic that originates from any other host device of the plurality of host devices.

As shown by reference number 104, the ingress node may determine whether traffic from the host device 1 is allowed (e.g., to be forwarded by the ingress node, such as to a security node of the plurality of security nodes). The ingress node may determine whether traffic from the host device 1 is allowed based on the ingress filter of the ingress node. For example, the ingress node may process (e.g., parse and/or read) the first traffic to identify information associated with the first traffic (e.g., a source IP address, a source port, and/or or similar information associated with the host device 1), and may search the ingress filter based on the information to identify an entry in the ingress filter associated with the host device 1. When the entry indicates that traffic from the host device 1 is not allowed (e.g., because the host device 1 has been determined to be malicious, compromised, or otherwise untrustworthy), the ingress node may determine that traffic from the host device 1 is not allowed and may therefore block the first traffic (e.g., prevent the first traffic from being forwarded by the ingress node).

Alternatively, when the entry indicates that traffic from the host device 1 is allowed (e.g., because the host device 1 has not been determined to be malicious, compromised, or otherwise untrustworthy), the ingress node may determine that traffic from the host device 1 is allowed. Additionally, the ingress node may determine, based on providing at least one security functionality (e.g., that is associated with layer 3 of the OSI model) in association with the first traffic, that the first traffic is to be forwarded (e.g., because the ingress node determined that the first traffic is not malicious, is not compromised, and is not otherwise untrustworthy).

Accordingly, as shown by reference number 106, the ingress node may select a security node (e.g., to which ingress node is to forward the first traffic). The ingress node may select the security node using a load balancing functionality. For example, the ingress node may select a security node (e.g., an individual security node, or a first security node of a service chain) based on a load of the plurality of security nodes and/or a load of the plurality of service chains. As shown in FIG. 1A, the ingress node may select the security node 1-1.

As shown by reference number 108, the ingress node may forward the first traffic to the security node 1-1 (e.g., to the selected security node). The ingress node may send the first traffic to the security node 1-1 via a connection between the ingress node and the security node 1-1. Accordingly, the security node 1-1 may receive the first traffic from the ingress node (e.g., via the connection between the ingress node and the security node 1-1).

As shown in FIG. 1B, and by reference number 110, the security node 1-1 may determine whether the first traffic is to be forwarded (e.g., by the security node 1-1). For example, the security node 1-1 may determine, based on providing at least one security functionality (e.g., that is associated with at least one layer of layers 4 through 7 of the OSI model) in association with the first traffic, that the first traffic is to be forwarded (e.g., because the security node 1-1 determined that the first traffic is not malicious, is not compromised, or is not otherwise untrustworthy). The security node 1-1 may therefore forward the first traffic (e.g., to a destination indicated by the first traffic, or to another security node in the service chain 1). As an alternative example, the security node 1-1 may determine, based on providing at least one security functionality, that the first traffic is to be blocked (e.g., because the security node 1-1 determined that the first traffic is malicious, compromised, or otherwise untrustworthy). Accordingly, as shown by reference number 112, the security node 1-1 may block the first traffic (e.g., prevent the security node 1-1 from forwarding the first traffic).

As shown by reference number 114, the security node 1-1 may send a message to the ingress node (e.g., based on determining that the first traffic is to be blocked and/or based on blocking the first traffic). The message may indicate that traffic from the host device 1 (e.g., any traffic that originates from the host device 1 and/or that indicates the host device 1 as a source of the traffic) is to be blocked. The message may include a generic network virtualization encapsulation (geneve) packet, as further described herein in relation to FIGS. 2A-2C. The security node 1-1 may send the message to the ingress node via the connection between the ingress node and the security node 1-1. Accordingly, the ingress node may receive the message from the security node 1-1 (e.g., via the connection between the ingress node and the security node 1-1).

Accordingly, as shown by reference number 116, the ingress node may update the ingress filter of the ingress node. The ingress node may update the ingress filter based on the message. For example, the ingress node may update, using the message (e.g., that indicates that that traffic from the host device 1 is to be blocked), the ingress filter to indicate that traffic from the host device 1 is to be blocked. In a specific example, the ingress node may update the ingress filter to include an entry that indicates that traffic from the host device 1 (e.g., that indicates a source IP address, a source port, and/or other information of the host device 1) is to be blocked.

As shown by reference number 118, the ingress node may send a message (e.g., a response message) to the security node 1-1 (e.g., after updating the ingress filter). The message may indicate that the ingress node was successfully updated (e.g., by the ingress node). The message may include a geneve packet, as further described herein in relation to FIGS. 2A-2C. The ingress node may send the message to the security node 1-1 via the connection between the ingress node and the security node 1-1. Accordingly, the security node 1-1 may receive the message from the ingress node (e.g., via the connection between the ingress node and the security node 1-1).

While security node 1-1 is described as performing operations shown in FIG. 1B, the operations may be performed by any security node within a service chain to which the ingress node forwarded the first traffic. For example, each operation may be performed by the security node 1-X (e.g., after the first traffic is forwarded to the security node 1-X by the security node 1-1 and any other security node of the service chain 1). Accordingly, the security node 1-X may send a message (e.g., in a similar manner as that described herein in relation to reference number 114) to the ingress node by sending the message to another security node associated with the service chain 1 to allow the message to be forwarded (e.g., by one or more other security nodes of the service chain 1, including the security node 1-1) to the ingress node. Additionally, or alternatively, the security node 1-X may receive a message that was sent by the ingress node (e.g., in a similar manner as that described herein in relation to reference number 118) based on the message being forwarded (e.g., by one or more other security nodes of the service chain 1, including the security node 1-1) to the security node 1-X.

As shown in FIG. 1C, and by reference number 120, the host device 1, of the plurality of host devices, may send second traffic to the ingress node (e.g., after the ingress node updated the ingress filter of the ingress node as described herein in relation to FIG. 1B and reference number 116). The host device 1 may send the second traffic to the ingress node via the connection between the host device 1 and the ingress node. Accordingly, the ingress node may receive the second traffic from the host device 1 (e.g., via the connection between the host device 1 and the ingress node). The host device 1 may send the second traffic to the ingress node to allow the ingress node and one or more security nodes to provide at least one security functionality associated with the second traffic and/or to allow the second traffic to be forwarded (e.g., to a destination indicated by the second traffic).

As shown by reference number 122, the ingress node may determine whether traffic from the host device 1 is allowed (e.g., based on receiving the second traffic). The ingress node may determine whether traffic from the host device 1 is allowed based on the ingress filter of the ingress node in a similar manner as that described herein in relation to FIG. 1A and reference number 104. For example, the ingress node may process (e.g., parse and/or read) the second traffic to identify information associated with the second traffic (e.g., a source IP address, a source port, and/or or similar information associated with the host device 1), and may search the ingress filter based on the information to identify an entry in the ingress filter associated with the host device 1. The entry may indicate (e.g., based on the ingress node updating the ingress filter as described herein in relation to FIG. 1B and reference number 116) that traffic from the host device 1 is not allowed. Accordingly, as shown by reference number 124, the ingress node may block the second traffic (e.g., prevent the ingress node from forwarding the second traffic).

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2A:
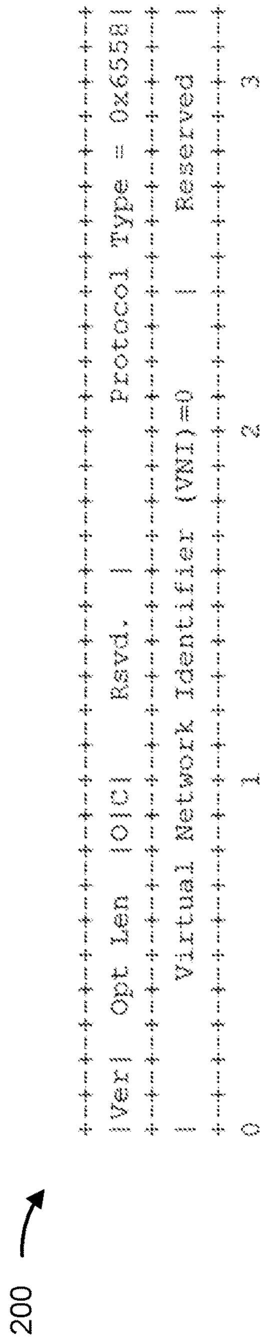
FIGS. 2A-2C are diagrams of an example of a generic network virtualization encapsulation packet that may be included in a message described herein.
Figure 2B:
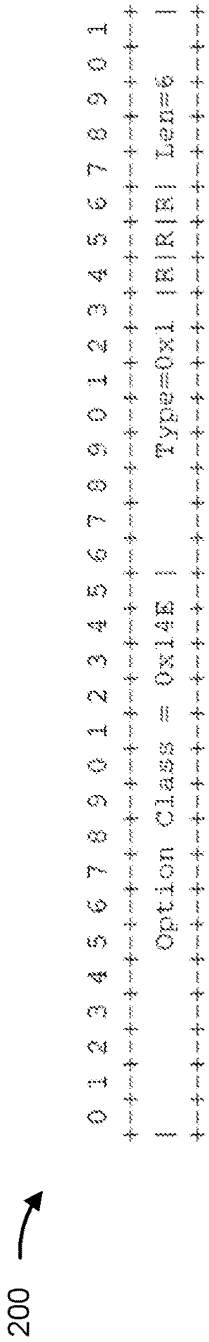
Figure 2C:
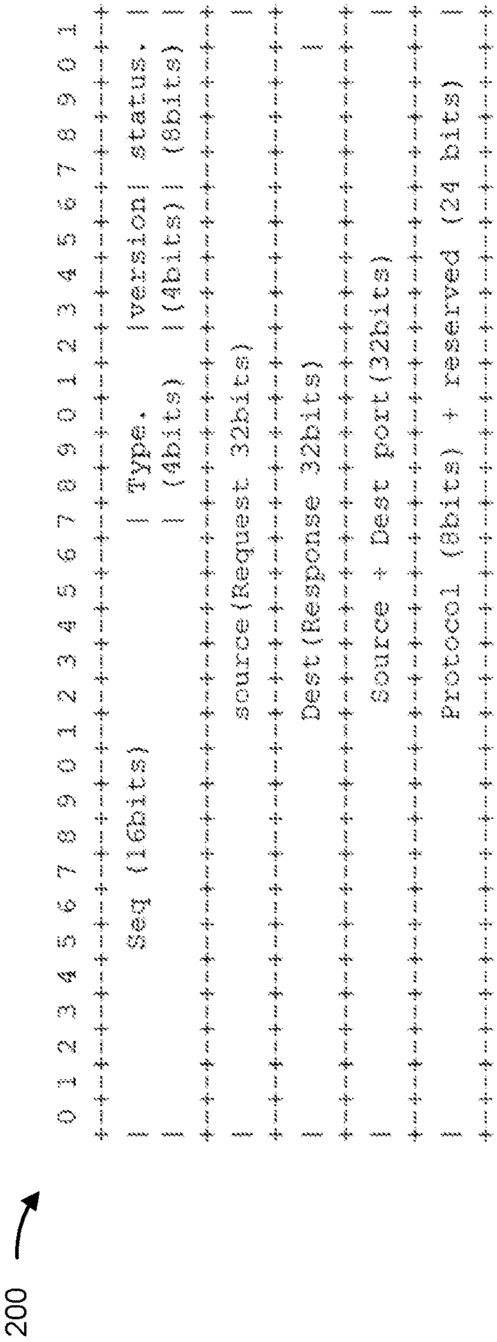

FIGS. 2A-2C are diagrams of an example 200 of a geneve packet that may be included in a message described herein. FIG. 2A shows a header of the geneve packet, where a protocol type field (0x6558) may indicate that a payload of the geneve packet is an Ethernet frame. FIG. 2B shows an option type-length-value (TLV) of the geneve packet, where an option class field (0x14E) and type field (0x1) may indicate that the geneve packet is intended to be used to update an ingress filter of the ingress node and/or to report on updating of the ingress filter by the ingress node. FIG. 2C shows an options header associated with the TLV, where a sequence field may indicate a sequence number associated with the geneve packet, a type field may indicate whether the geneve packet is to be used to update the ingress filter (e.g., with a value 0x1) or to report on updating of the ingress filter (e.g., with a value 0x2), a version field may indicate a version of the options header, a status field may indicate a status (e.g., success or failure) of updating the ingress filter, a source IP field may indicate an IP address of a node (e.g., the ingress node or a security node) that originated the geneve packet, a destination IP field may indicate an IP address of a node (e.g., the ingress node or the security node) that is an intended recipient of the geneve packet, a source and destination port field may indicate a source port and/or destination port associated with the geneve packet, and a protocol field may indicate a protocol associated with the geneve packet.

As indicated above, FIGS. 2A-2C are provided as an example. Other examples may differ from what is described with regard to FIGS. 2A-2C.

Figure 3:
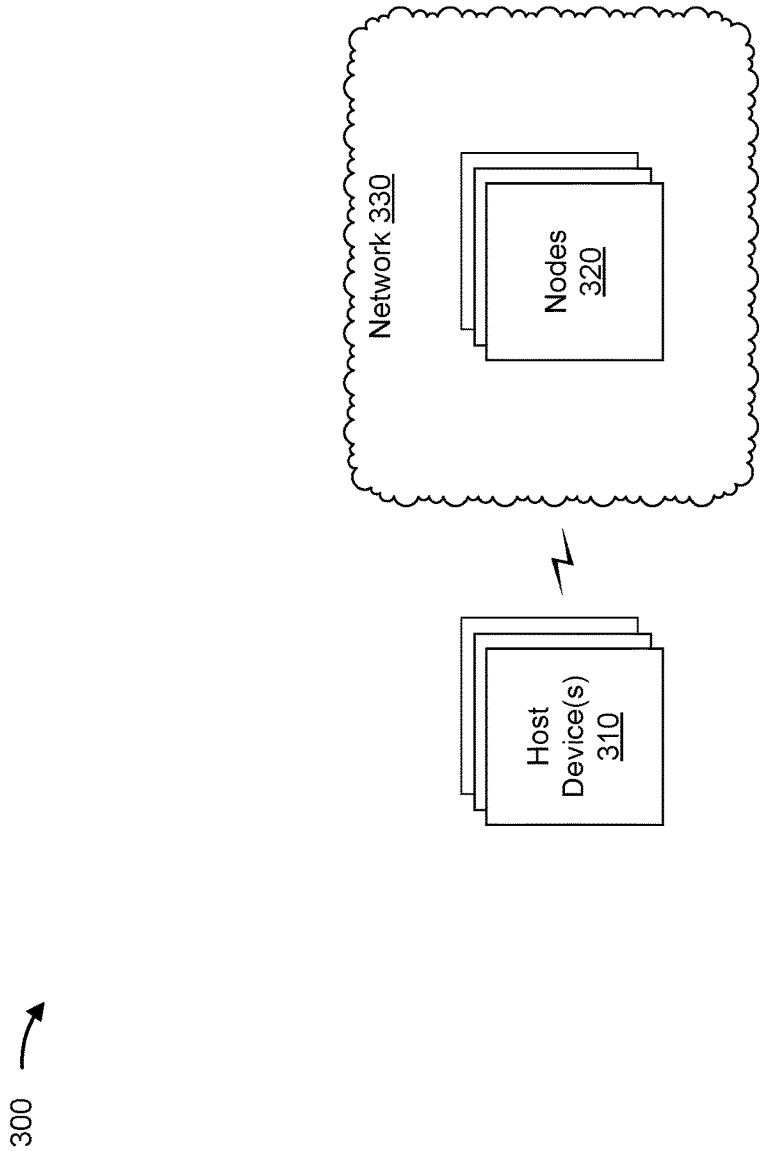
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include one or more host devices 310, a group of nodes 320, and a network 330. Devices of environment 300 may interconnect via wired connections, wireless connections, or a combination of wired and wireless connections.

Host device 310 includes one or more devices capable of providing traffic. For example, host device 310 may include a router, a gateway, a switch, a firewall, a hub, a bridge, a reverse proxy, a server (e.g., a proxy server), a security device, an intrusion detection device, a load balancer, or a similar type of device. In some implementations, host device 310 may include an endpoint device that is a source of traffic. For example, host device 310 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. Host device 310 may provide traffic to other devices via network 330 (e.g., by using node(s) 320 as an intermediary), such as devices that are external to network 330.

Node 320 includes one or more devices capable of receiving, processing, storing, routing, and/or providing traffic in a manner described herein. For example, node 320 may include a router, such as a label switching router (LSR), a label edge router (LER), an ingress router, an egress router, a provider router (e.g., a provider edge router, a provider core router, etc.), a virtual router, or another type of router. Additionally, or alternatively, node 320 may include a gateway, a switch, a firewall, a hub, a bridge, a reverse proxy, a server (e.g., a proxy server, a cloud server, a data center server, etc.), a load balancer, and/or a similar device. Node 320 may be an ingress node, a security node, or another type of node.

In some implementations, node 320 may be a physical device implemented within a housing, such as a chassis. In some implementations, node 320 may be a virtual device implemented by one or more computer devices of a cloud computing environment or a data center.

Network 330 includes one or more wired and/or wireless networks. For example, network 330 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as one or more examples. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
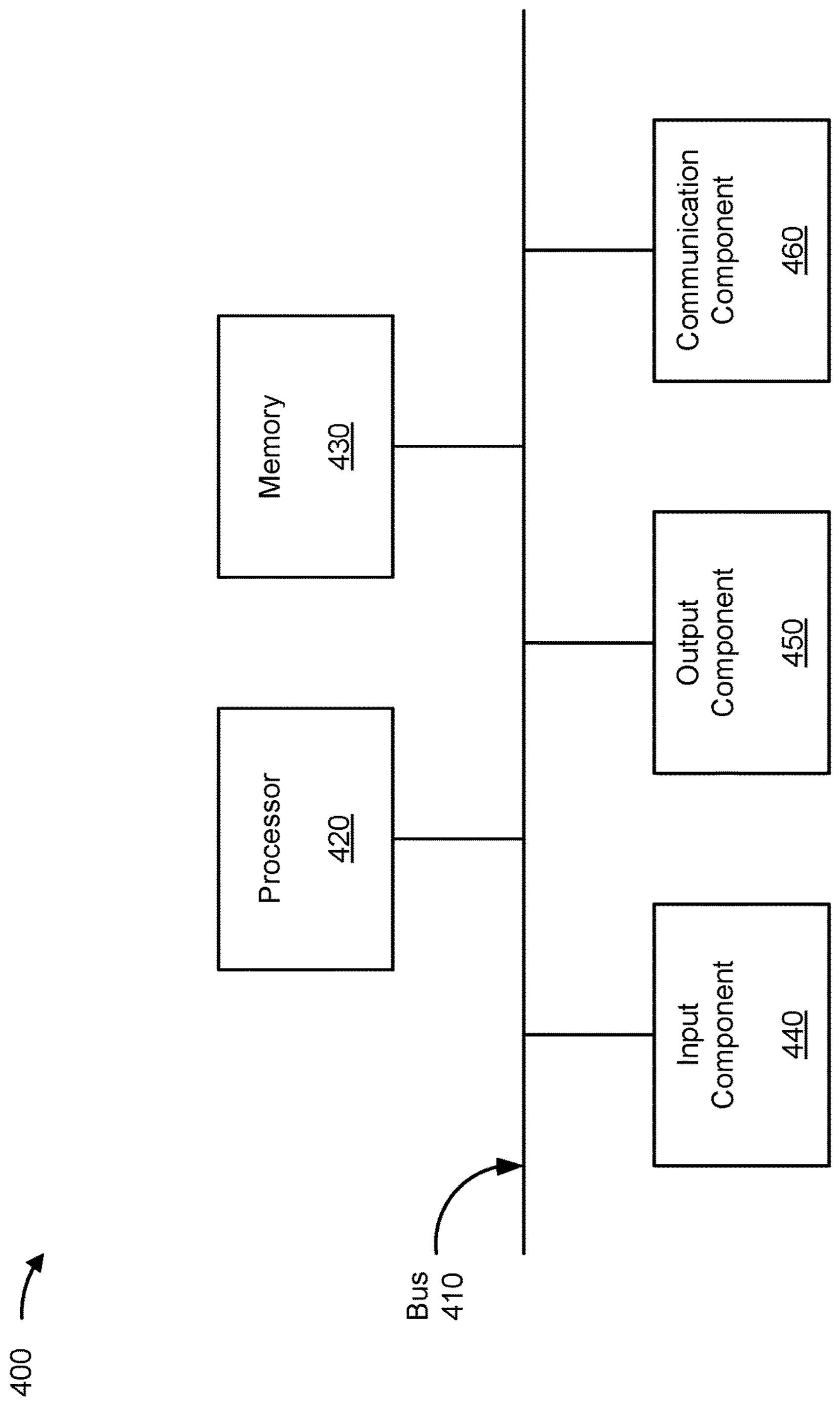
FIG. 4 is a diagram of example components of a device associated with updating an ingress filter of an ingress node that provides a load balancing functionality across security nodes.

FIG. 4 is a diagram of example components of a device 400 associated with updating an ingress filter of an ingress node that provides a load balancing functionality across security nodes. The device 400 may correspond to host device 310 and/or node 320. In some implementations, host device 310 and/or node 320 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
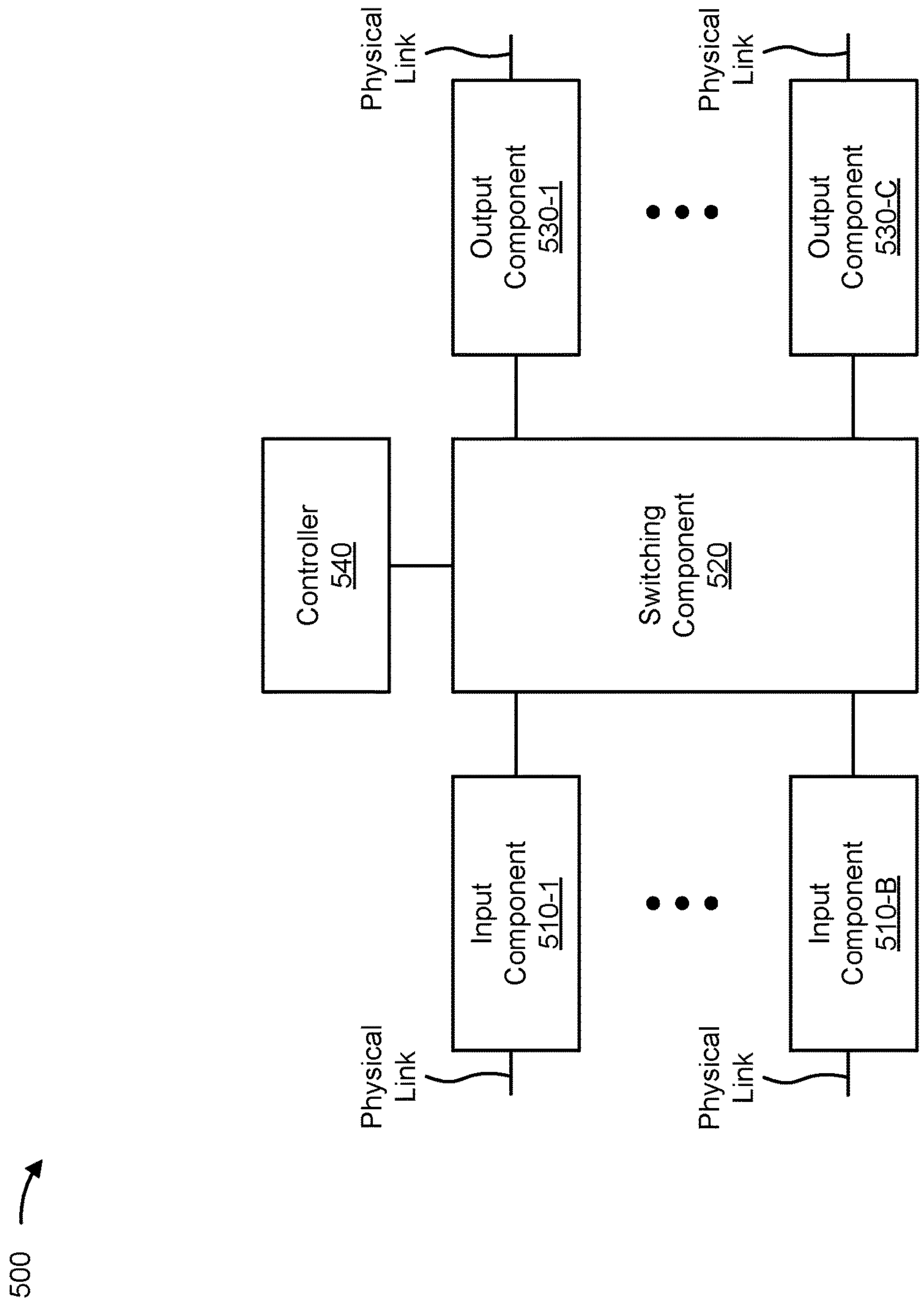
FIG. 5 is a diagram of example components of a device associated with updating an ingress filter of an ingress node that provides a load balancing functionality across security nodes.

FIG. 5 is a diagram of example components of a device 500 associated with updating an ingress filter of an ingress node that provides a load balancing functionality across security nodes. Device 500 may correspond to host device 310 and/or node 320. In some implementations, host device 310 and/or node 320 may include one or more devices 500 and/or one or more components of device 500. As shown in FIG. 5, device 500 may include one or more input components 510-1 through 510-B (B≥1) (hereinafter referred to collectively as input components 510, and individually as input component 510), a switching component 520, one or more output components 530-1 through 530-C (C≥1) (hereinafter referred to collectively as output components 530, and individually as output component 530), and a controller 540.

Input component 510 may be one or more points of attachment for physical links and may be one or more points of entry for incoming traffic, such as packets. Input component 510 may process incoming traffic, such as by performing data link layer encapsulation or decapsulation. In some implementations, input component 510 may transmit and/or receive packets. In some implementations, input component 510 may include an input line card that includes one or more packet processing components (e.g., in the form of integrated circuits), such as one or more interface cards (IFCs), packet forwarding components, line card controller components, input ports, processors, memories, and/or input queues. In some implementations, device 500 may include one or more input components 510.

Switching component 520 may interconnect input components 510 with output components 530. In some implementations, switching component 520 may be implemented via one or more crossbars, via busses, and/or with shared memories. The shared memories may act as temporary buffers to store packets from input components 510 before the packets are eventually scheduled for delivery to output components 530. In some implementations, switching component 520 may enable input components 510, output components 530, and/or controller 540 to communicate with one another.

Output component 530 may store packets and may schedule packets for transmission on output physical links. Output component 530 may support data link layer encapsulation or decapsulation, and/or a variety of higher-level protocols. In some implementations, output component 530 may transmit packets and/or receive packets. In some implementations, output component 530 may include an output line card that includes one or more packet processing components (e.g., in the form of integrated circuits), such as one or more IFCs, packet forwarding components, line card controller components, output ports, processors, memories, and/or output queues. In some implementations, device 500 may include one or more output components 530. In some implementations, input component 510 and output component 530 may be implemented by the same set of components (e.g., and input/output component may be a combination of input component 510 and output component 530).

Controller 540 includes a processor in the form of, for example, a CPU, a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 540 may include one or more processors that can be programmed to perform a function.

In some implementations, controller 540 may include a RAM, a ROM, and/or another type of dynamic or static storage device (e.g., a flash memory, a magnetic memory, an optical memory, etc.) that stores information and/or instructions for use by controller 540.

In some implementations, controller 540 may communicate with other devices, networks, and/or systems connected to device 500 to exchange information regarding network topology. Controller 540 may create routing tables based on the network topology information, may create forwarding tables based on the routing tables, and may forward the forwarding tables to input components 510 and/or output components 530. Input components 510 and/or output components 530 may use the forwarding tables to perform route lookups for incoming and/or outgoing packets.

Controller 540 may perform one or more processes described herein. Controller 540 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 540 from another computer-readable medium or from another device via a communication interface. When executed, software instructions stored in a memory and/or storage component associated with controller 540 may cause controller 540 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
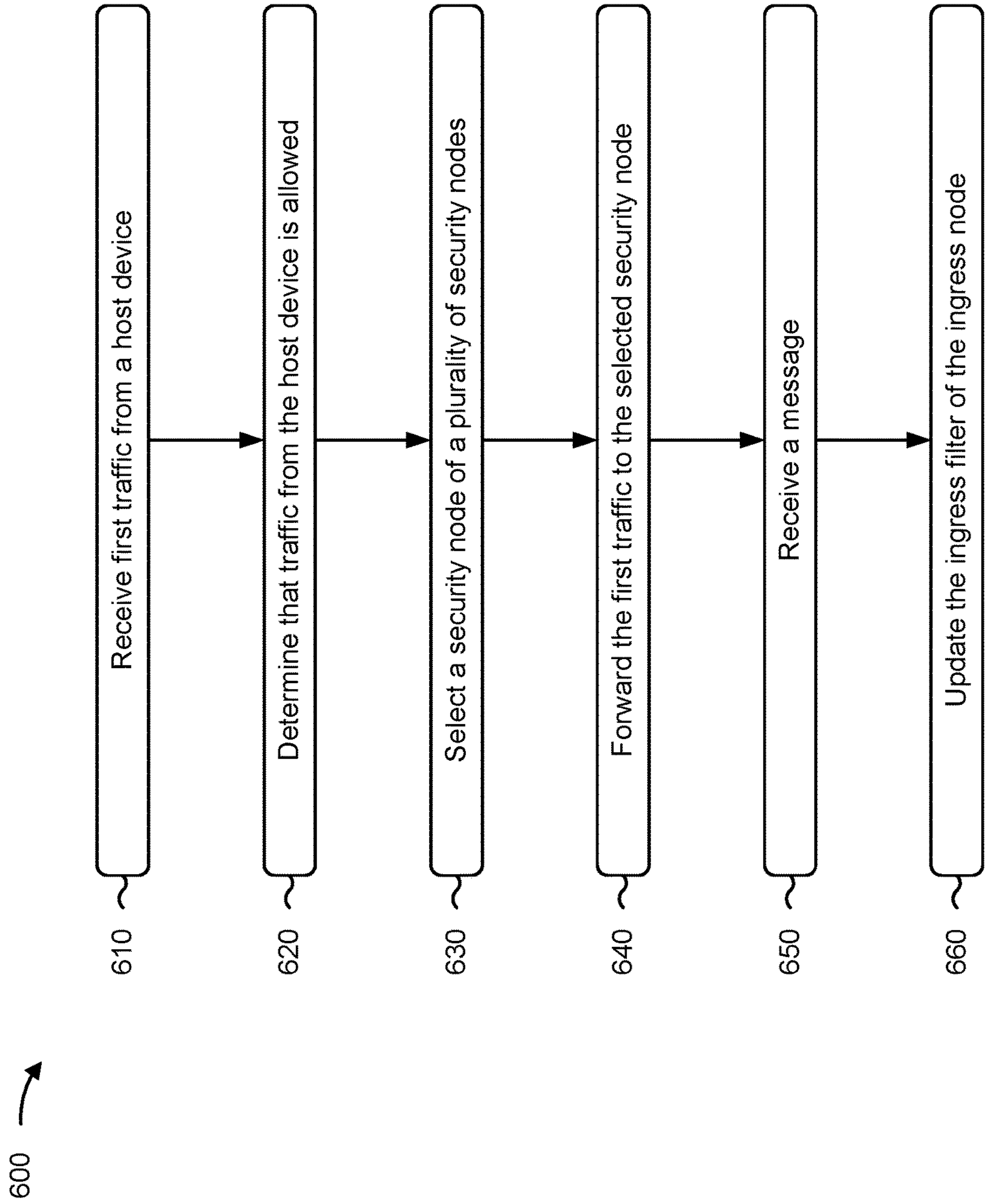
FIG. 6 is a flowchart of an example process associated with updating an ingress filter of an ingress node that provides a load balancing functionality across security nodes.

FIG. 6 is a flowchart of an example process 600 associated with updating an ingress filter of an ingress node that provides a load balancing functionality across security nodes. In some implementations, one or more process blocks of FIG. 6 are performed by an ingress node (e.g., a node 320 configured as an ingress node). In some implementations, one or more process blocks of FIG. 6 are performed by another device or a group of devices separate from or including the ingress node, such as a host device (e.g., a host device 310) and/or another node (e.g., another node 320). Additionally, or alternatively, one or more process blocks of FIG. 6 may be performed by one or more components of device 400, such as processor 420, memory 430, input component 440, output component 450, and/or communication component 460; of device 500, such as input component 510, switching component 520, output component 530, and/or controller 540; and/or of another device.

As shown in FIG. 6, process 600 may include receiving first traffic from a host device (block 610). For example, the ingress node may receive first traffic from a host device, as described above.

As further shown in FIG. 6, process 600 may include determining that traffic from the host device is allowed (block 620). For example, the ingress node may determine, based on an ingress filter of the ingress node, that traffic from the host device is allowed, as described above.

As further shown in FIG. 6, process 600 may include selecting a security node of a plurality of security nodes (block 630). For example, the ingress node may select, using a load balancing functionality, and based on determining that traffic from the host device is allowed, a security node, of a plurality of security nodes, to which the ingress node is to forward the first traffic, as described above.

As further shown in FIG. 6, process 600 may include forwarding the first traffic to the selected security node (block 640). For example, the ingress node may forward the first traffic to the selected security node, as described above.

As further shown in FIG. 6, process 600 may include receiving a message (block 650). For example, the ingress node may receive, based on forwarding the first traffic, a message that indicates that traffic from the host device is to be blocked, as described above.

As further shown in FIG. 6, process 600 may include updating the ingress filter of the ingress node (block 660). For example, the ingress node may update, using the message, the ingress filter of the ingress node to indicate that traffic from the host device is to be blocked, as described above.

Process 600 may include additional implementations, such as any single implementation or any combination of implementations described below and/or in connection with one or more other processes described elsewhere herein.

In a first implementation, process 600 includes receiving, after updating the ingress filter of the ingress node, second traffic from the host device; determining, based on the ingress filter of the ingress node, that traffic from the host device is not allowed; and blocking, based on determining that traffic from the host device is not allowed, the second traffic.

In a second implementation, alone or in combination with the first implementation, the message was sent by the selected security node.

In a third implementation, alone or in combination with one or more of the first and second implementations, the selected security node is associated with a service chain of security nodes, and the message was sent by another security node associated with the service chain of security nodes.

In a fourth implementation, alone or in combination with one or more of the first through third implementations, the ingress node is configured to provide a security functionality associated with layer 3 of the OSI model.

In a fifth implementation, alone or in combination with one or more of the first through fourth implementations, the selected security node is configured to provide a security functionality associated with at least one layer of layers 4 through 7 of the OSI model.

In a sixth implementation, alone or in combination with one or more of the first through fifth implementations, the message includes a generic network virtualization encapsulation (geneve) packet.

In a seventh implementation, alone or in combination with one or more of the first through sixth implementations, process 600 includes sending, after updating the ingress filter of the ingress node, and to the selected security node, another message indicating that the ingress filter was successfully updated.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

Figure 7:
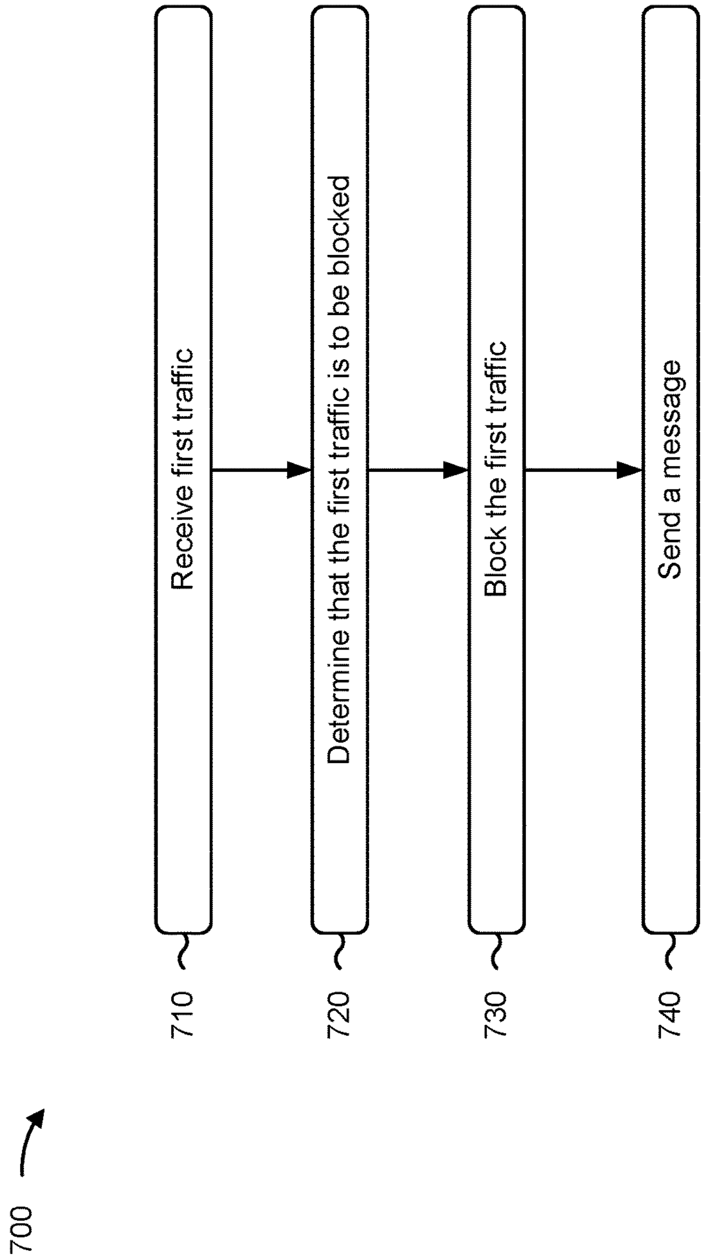
FIG. 7 is a flowchart of an example process associated with updating an ingress filter of an ingress node that provides a load balancing functionality across security nodes.

FIG. 7 is a flowchart of an example process 700 associated with updating an ingress filter of an ingress node that provides a load balancing functionality across security nodes. In some implementations, one or more process blocks of FIG. 7 are performed by a security node (e.g., a node 320 configured as security node). In some implementations, one or more process blocks of FIG. 7 are performed by another device or a group of devices separate from or including the security node, such as a host device (e.g., a host device 310) and/or another node (e.g., another node 320). Additionally, or alternatively, one or more process blocks of FIG. 7 may be performed by one or more components of device 400, such as processor 420, memory 430, input component 440, output component 450, and/or communication component 460; of device 500, such as input component 510, switching component 520, output component 530, and/or controller 540; and/or of another device.

As shown in FIG. 7, process 700 may include receiving first traffic (block 710). For example, the security node may receive first traffic that was forwarded by an ingress node and that originated from a host device, as described above.

As further shown in FIG. 7, process 700 may include determining that the first traffic is to be blocked (block 720). For example, the security node may determine, by providing a security functionality, that the first traffic is to be blocked, as described above.

As further shown in FIG. 7, process 700 may include blocking the first traffic (block 730). For example, the security node may block, based on determining that the first traffic is to be blocked, the first traffic, as described above.

As further shown in FIG. 7, process 700 may include sending a message (block 740). For example, the security node may send, to the ingress node, and based on determining that the first traffic is to be blocked, a message that indicates that traffic from the host device is to be blocked, as described above.

Process 700 may include additional implementations, such as any single implementation or any combination of implementations described below and/or in connection with one or more other processes described elsewhere herein.

In a first implementation, sending the message allows the ingress node to update an ingress filter of the ingress node to indicate that traffic from the host device is to be blocked.

In a second implementation, alone or in combination with the first implementation, sending the message allows the ingress node to block second traffic from the host device.

In a third implementation, alone or in combination with one or more of the first and second implementations, the security node is associated with a service chain of security nodes, and sending the message to the ingress node includes sending the message to another security node associated with the service chain to allow the message to be forwarded to the ingress node.

In a fourth implementation, alone or in combination with one or more of the first through third implementations, the ingress node is configured to provide another security functionality that is associated with layer 3 of the OSI model.

In a fifth implementation, alone or in combination with one or more of the first through fourth implementations, the security functionality is associated with at least one layer of layers 4 through 7 of the OSI model.

In a sixth implementation, alone or in combination with one or more of the first through fifth implementations, process 700 includes receiving, after sending the message, another message indicating that an ingress filter of the ingress node was successfully updated.

Although FIG. 7 shows example blocks of process 700, in some implementations, process 700 includes additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code-it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors to: perform X; perform Y; and perform Z," that claim should be interpreted to mean "one or more processors to perform X; one or more (possibly different) processors to perform Y; and one or more (also possibly different) processors to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

receiving, by an ingress node, first traffic from a host device;

determining, by the ingress node, and based on an ingress filter of the ingress node, that traffic from the host device is allowed, wherein the determination determining is related to a first security functionality associated with a network layer including at least one of a filtering functionality or a firewall functionality;

selecting, by the ingress node, using a load-balancing functionality across a plurality of security nodes, and based on determining that traffic from the host device is allowed, a security node to which the ingress node is to forward the first traffic, wherein the load-balancing functionality comprises selecting the security node based on a load of the plurality of security nodes or a load of a plurality of service chains, wherein the plurality of security nodes are grouped into the plurality of service chains, wherein the selected security node is configured to perform a second security functionality, associated with at least one of a transport layer, a sessions layer, a presentation layer, or an application layer, including at least one of a packet inspection functionality or an intrusion prevention functionality, performed on the forwarded first traffic, and wherein different security nodes of the plurality of security nodes provide different security functionalities;

receiving, by the ingress node, from the selected security node that provides the second security functionality and based on forwarding the first traffic to the selected security node, a message that indicates that traffic from the host device is to be blocked; and blocking, based on updating the ingress filter using the message, second traffic from the host device.

2. The method of claim 1, further comprising:

receiving, after updating the ingress filter of the ingress node, second traffic from the host device; and determining, based on the ingress filter of the ingress node, that traffic from the host device is not allowed.

3. The method of claim 1, wherein the message was sent by the selected security node based on performing the second security functionality.

4. The method of claim 1, wherein the selected security node is associated with a service chain of security nodes, and wherein the message was sent by another security node associated with the service chain of security nodes.

5. The method of claim 1, wherein the network layer is layer 3 of the OSI model.

6. The method of claim 1, wherein the at least one of the transport layer, the sessions layer, the presentation layer or the application layer are associated with at least one layer of layers 4 through 7 of an open systems interconnection (OSI) model.

7. The method of claim 1, wherein the message includes a generic network virtualization encapsulation (geneve) packet.

8. The method of claim 1, further comprising:
sending, after updating the ingress filter of the ingress node, and to the selected security node, another message indicating that the ingress filter was successfully updated.

9. A security node, comprising:
one or more memories; and
one or more processors to:
receive first traffic that was forwarded by an ingress node and that originated from a host device,
wherein the security node is selected by the ingress node based on using a load-balancing functionality across a plurality of security nodes, and based on determining that traffic from the host device is allowed,
wherein the load-balancing functionality comprises selecting the security node based on a load of the plurality of security nodes or a load of a plurality of service chains, and
wherein the plurality of security nodes are grouped into the plurality of service chains;
determine, by performing a first security functionality on the first traffic, that the first traffic is to be blocked,
wherein different security nodes of the plurality of security nodes provide different security functionalities,
wherein the first security functionality is associated with at least one of a transport layer, a sessions layer, a presentation layer, or an application layer including at least one of a packet inspection functionality or an intrusion prevention functionality, and
wherein the ingress node provides a second security functionality associated with a network layer, including at least one of a filtering functionality or a firewall functionality;
block, based on determining that the first traffic is to be blocked, the first traffic; and
send, to the ingress node, a message that indicates that traffic from the host device is to be blocked and that causes update of an ingress filter of the ingress node.

10. The security node of claim 9, wherein the message allows the ingress node to update an ingress filter of the ingress node to indicate that traffic from the host device is to be blocked.

11. The security node of claim 9, wherein sending the message allows the ingress node to block second traffic from the host device.

12. The security node of claim 9, wherein the security node is associated with a service chain of security nodes, and
wherein the one or more processors, to send the message to the ingress node, are to send the message to another security node associated with the service chain to allow the message to be forwarded to the ingress node.

13. The security node of claim 9, wherein the network layer is associated with layer 3 of an open systems interconnection (OSI) model.

14. The security node of claim 9, wherein the at least one of the transport layer, the sessions layer, the presentation layer or the application layer are associated with at least one layer of layers 4 through 7 of an open systems interconnection (OSI) model.

15. The security node of claim 9, wherein the one or more processors are further to:
receive, after sending the message, another message indicating that an ingress filter of the ingress node was successfully updated.

16. A non-transitory computer-readable medium storing a set of instructions, the set of instructions comprising:
one or more instructions that, when executed by one or more processors of an ingress node, cause the ingress node to:
receive first traffic from a host device;
select, based on an ingress filter of the ingress node using a load-balancing functionality across a plurality of security nodes and based on determining that traffic from the host device is allowed, a security node to which the ingress node is to forward the first traffic,
wherein the ingress filter is related to a first security functionality associated with a network layer, including at least one of a filtering functionality or a firewall functionality; forward the first traffic to the selected security node,
wherein the load-balancing functionality comprises selecting the security node based on a load of the plurality of security nodes or a load of a plurality of service chains,
wherein the plurality of security nodes are grouped into the plurality of service chains,
wherein the selected security node is configured to perform a second security functionality associated with at least one of a transport layer, a sessions layer, a presentation layer, or an application layer, including at least one of a packet inspection functionality or an intrusion prevention functionality, performed on the forwarded first traffic, and
wherein different security nodes of the plurality of security nodes provide different security functionalities;
receive, from the selected security node that provides the second security functionality, and based on forwarding the first traffic to the selected security node, a message that indicates that traffic from the host device is to be blocked; and
block, based on updating the ingress filter using the message, second traffic from the host device.

17. The non-transitory computer-readable medium of claim 16, wherein the one or more instructions, when executed by the one or more processors, further cause the ingress node to:
receive, after updating the ingress filter of the ingress node, second traffic from the host device.

18. The non-transitory computer-readable medium of claim 16, wherein the message was sent by the selected security node, based on performing the second security functionality.

19. The non-transitory computer-readable medium of claim 16, wherein the selected security node is associated with a service chain of security nodes, and
wherein the message was sent by another security node associated with the service chain of security nodes.

20. The security node of claim 9, wherein the security node is part of a service chain.

* * * * *